(12) United States Patent
Yee et al.

(10) Patent No.: US 11,186,260 B2
(45) Date of Patent: Nov. 30, 2021

(54) WINDSCREEN WIPER DEVICE

(71) Applicant: TRICO PRODUCTS CORPORATION, Rochester Hills, MI (US)

(72) Inventors: Jesus Yee, El Paso, TX (US); Esteban Figueroa Ortiz, Cd Juarez (MX); Miguel Gutierrez, Cd Juarez (MX)

(73) Assignee: Trico Products Corporation, Rochester Hills, MI (US)

( * ) Notice: Subject to any disclaimer, the term of this patent is extended or adjusted under 35 U.S.C. 154(b) by 100 days.

(21) Appl. No.: 16/560,390

(22) Filed: Sep. 4, 2019

(65) Prior Publication Data

US 2020/0070781 A1    Mar. 5, 2020

Related U.S. Application Data

(60) Provisional application No. 62/726,534, filed on Sep. 4, 2018.

(51) Int. Cl.
*B60S 1/34* (2006.01)
*B60S 1/38* (2006.01)
*B60S 1/40* (2006.01)

(52) U.S. Cl.
CPC ............... *B60S 1/4038* (2013.01); *B60S 1/34* (2013.01); *B60S 1/3808* (2013.01); *B60S 1/3886* (2013.01)

(58) Field of Classification Search
CPC ......... B60S 1/4038; B60S 1/3808; B60S 1/34
See application file for complete search history.

(56) References Cited

U.S. PATENT DOCUMENTS

| | | | |
|---|---|---|---|
| 2009/0044365 A1* | 2/2009 | Koppen | B60S 1/3879 15/250.31 |
| 2015/0113755 A1* | 4/2015 | Cros | B60S 1/38 15/250.201 |
| 2015/0274132 A1* | 10/2015 | Polocoser | B60S 1/4048 15/250.32 |
| 2018/0354466 A1* | 12/2018 | Cox | B60S 1/386 |

* cited by examiner

*Primary Examiner* — Michael D Jennings
(74) *Attorney, Agent, or Firm* — Miller Canfield (57) ABSTRACT

A windscreen wiper device includes an elongated wiper blade, a spoiler, and a connector assembly. The spoiler is coupled to and extends between opposite ends along the longitudinal length of the wiper blade. The connector assembly is operably attached to the spoiler and detachably connects the windscreen wiper device to an oscillating wiper arm adapted to oscillate the wiper blade along the surface of a curved windshield of a vehicle.

16 Claims, 7 Drawing Sheets

WINDSCREEN WIPER DEVICE

CROSS REFERENCE TO RELATED APPLICATIONS

This application claims priority to U.S. Provisional Patent Application No. 62/726,534, filed Sep. 4, 2018, the disclosure of which is incorporated herein by reference in its entirety

BACKGROUND OF THE INVENTION

The present invention is related generally to a windscreen wiper device and more particularly, to a connector assembly for attaching a windscreen wiper device with an oscillating wiper arm to a vehicle.

SUMMARY OF THE INVENTION

According to the invention, a windscreen wiper device includes a wiper blade, a spoiler, and a connector assembly. The spoiler is coupled to and extends between opposite ends along the longitudinal length of the wiper blade. The connector assembly is operably attached to the spoiler and detachably connects the windscreen wiper device to an oscillating wiper arm adapted to oscillate the wiper blade along the surface of a curved windshield of a vehicle.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE PREFERRED EMBODIMENTS

Referring now to the Figures, where the invention will be described with reference to specific embodiments, without limiting same, wherein like numerals indicate like or corresponding parts throughout the several views.

Figure 1:
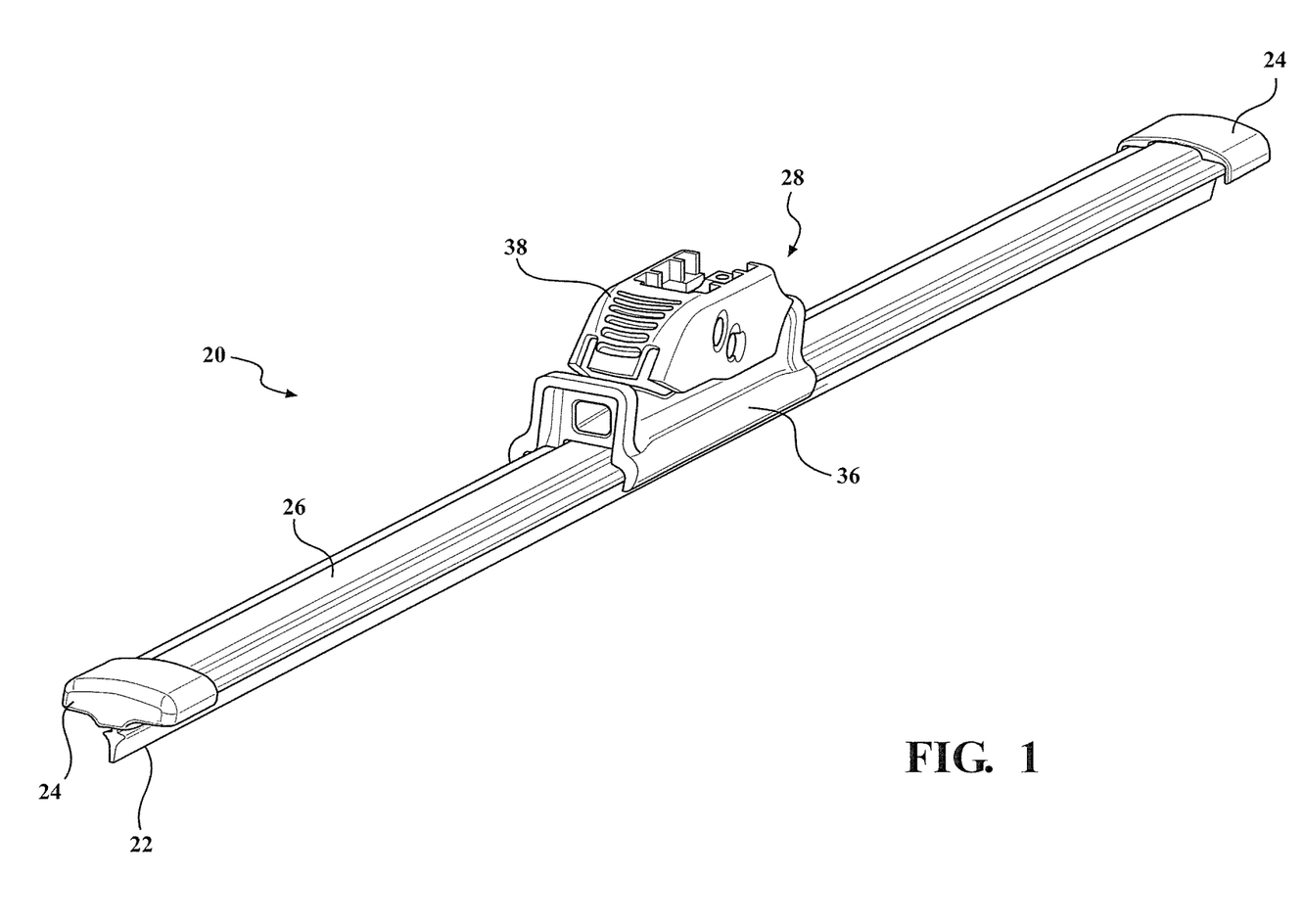
FIG. 1 is an exemplary embodiment of an improved windscreen wiper device that is constructed according to one aspect of the present invention.

Referring to FIG. 1, the windscreen wiper device 20 includes a wiper blade 22 (also known as a wiper strip or a wiper element) that is made of a flexible material, such as rubber, and that extends in a longitudinal direction. The windscreen wiper device 20 is of a beam-style construction in that it includes a carrier element 21 (See FIG. 11) which operably supports the wiper blade 22 and biases the wiper blade 22 into a curved configuration to seal its full length against a curved windshield (not shown) of a vehicle as the windscreen wiper device 20 oscillates back and forth along the curved windshield during operation of the vehicle. This is in contrast to conventional-style windscreen wiper devices which utilize a frame with a plurality of yokes to accomplish the same objective. In the exemplary embodiment, the carrier element 21 preferably includes a pair of longitudinal strips, which are made of a spring-steel material, that are received in opposing longitudinal grooves on the wiper blade 22 as is commonly known in the art.

The windscreen wiper device 20 also includes a pair of end caps 24 which are fixedly attached on opposite ends of a spoiler 26 connecting the wiper blade 22 to the spoiler 26. The spoiler 26 is retained on the carrier element 21 and extends along the length of the wiper blade 22 between the end caps 24. The spoiler 26 acts a connector between the wiper blade 22 and a connector assembly 28 of the windscreen wiper device 20.

As discussed in further detail below, the connector assembly 28 is fixedly attached with the spoiler 26 approximately at a longitudinal midpoint of the windscreen wiper device 20 for detachably connecting the windscreen wiper device 20 with an oscillating wiper arm (not shown). As discussed in further detail below, this attachment requires no hypersonic welding, or any other direct connection between the connector assembly 28 and the carrier element 21.

Figures 2, 3, 4:
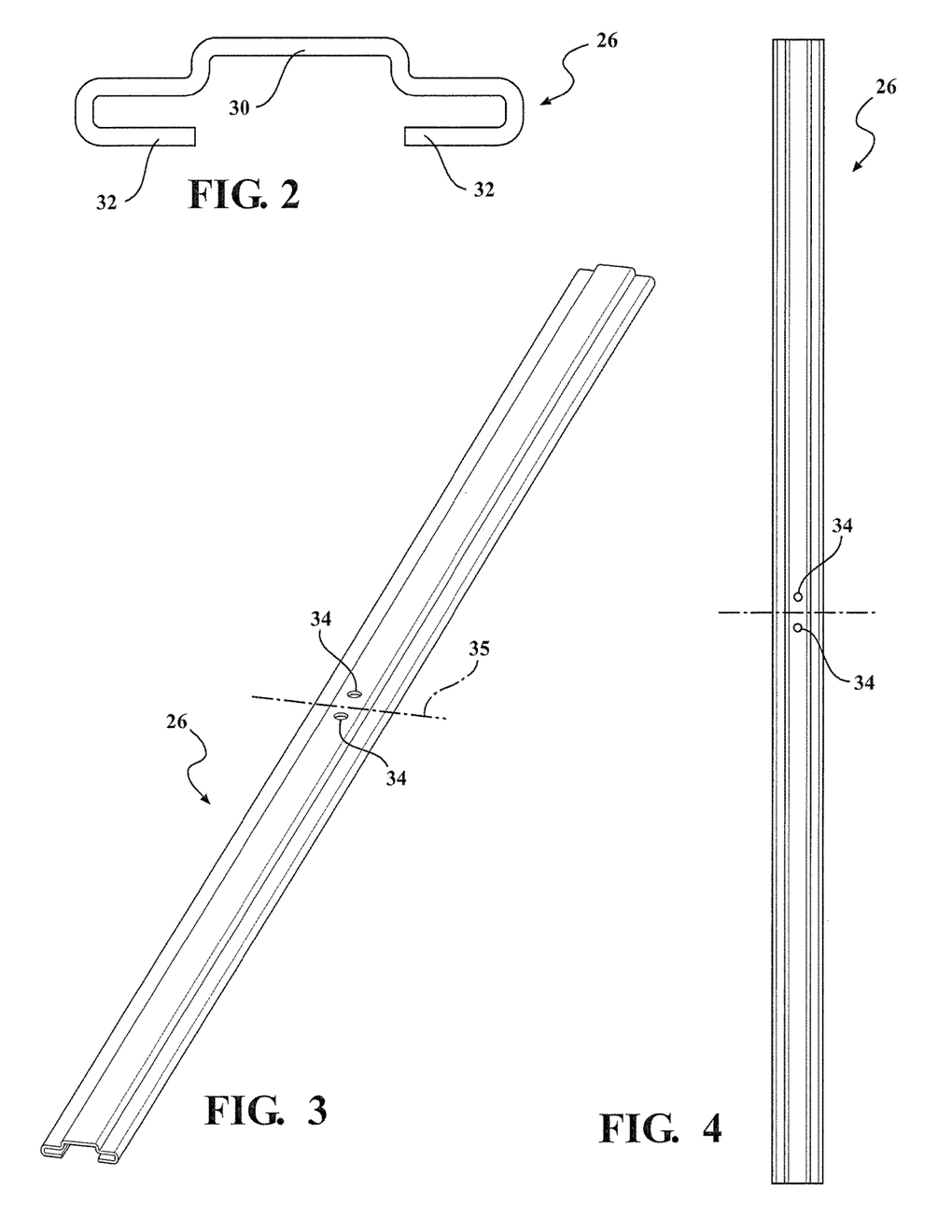
FIG. 2 is a front view of a spoiler of the windscreen wiper device shown in FIG. 1.
FIG. 3 is a perspective view of the spoiler of FIG. 2.
FIG. 4 is a top elevation view of the spoiler of FIG. 2.
Figure 5:
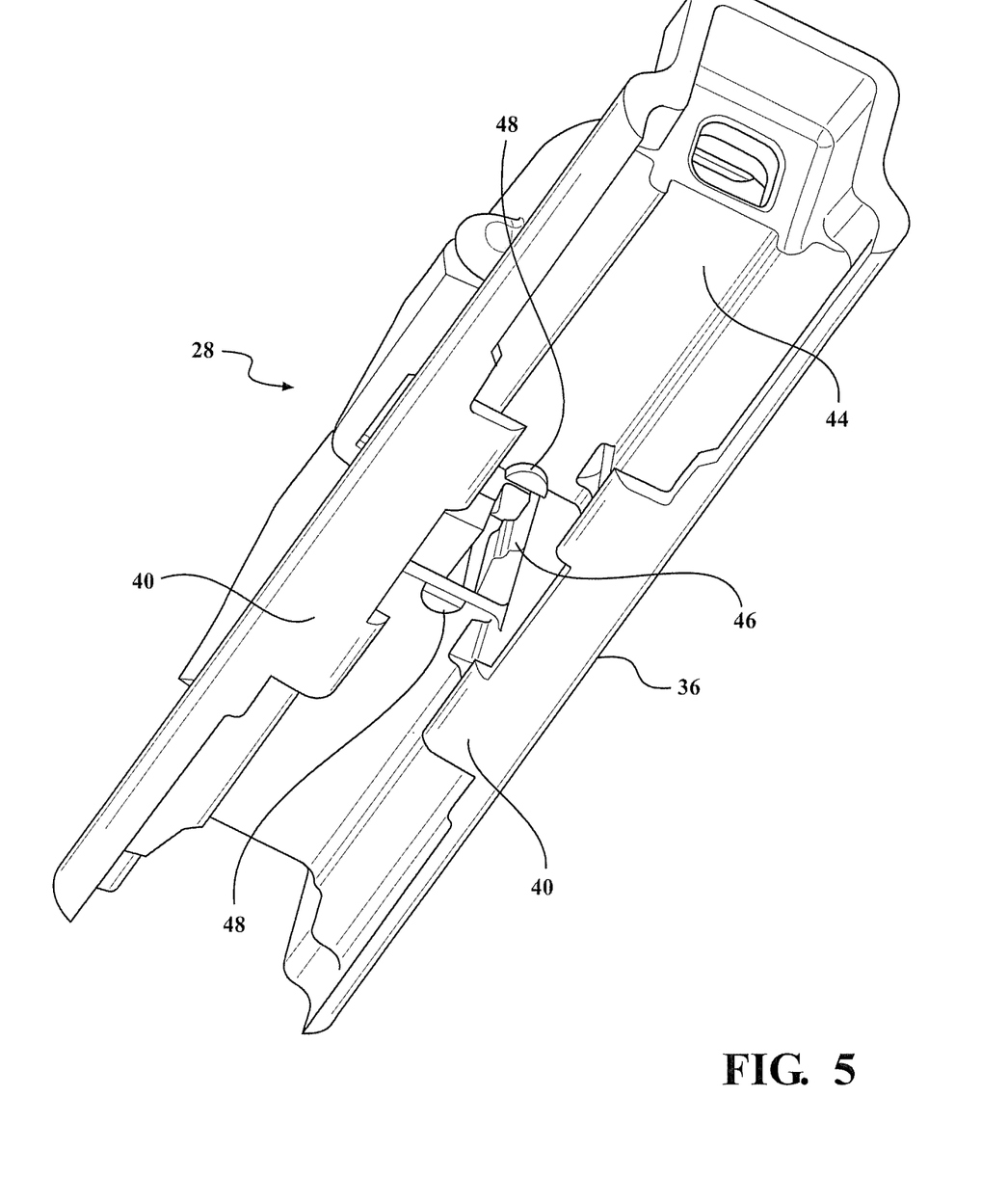
FIG. 5 is a perspective view of a connector assembly of the windscreen wiper device of FIG. 1.
Figure 6:
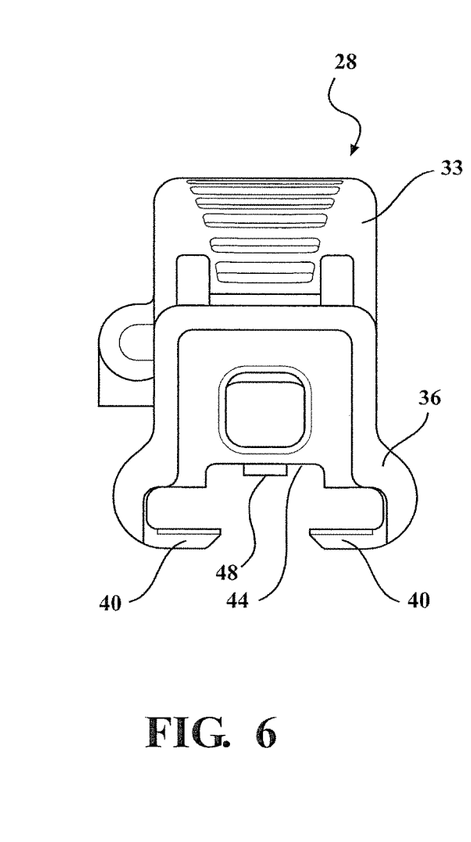
FIG. 6 is a front elevation view of the connector assembly of FIG. 5.
Figure 7:
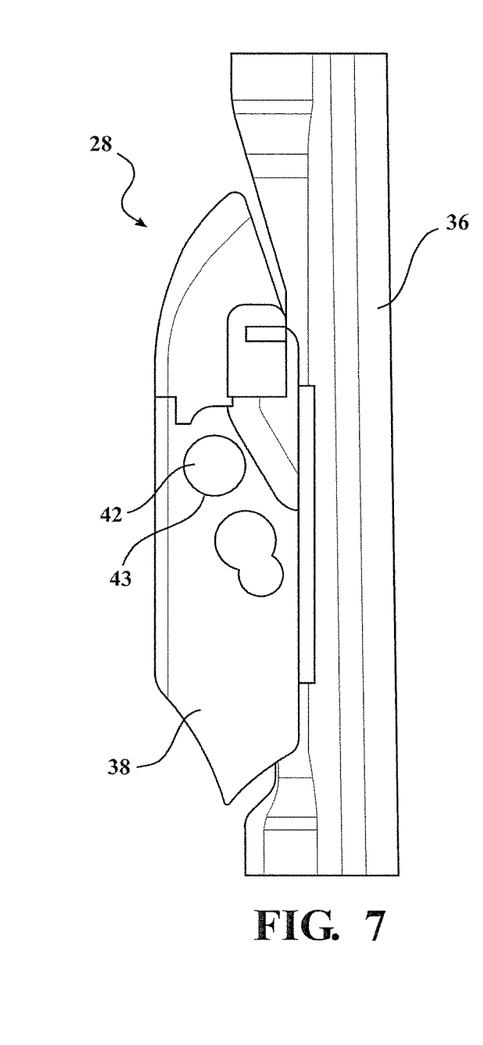
FIG. 7 is a side elevation view of the connector assembly of FIG. 5.
Figure 8:
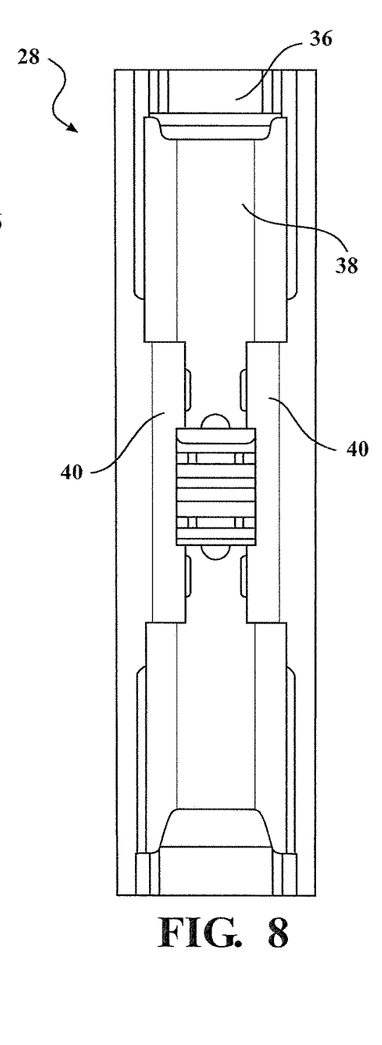
FIG. 8 is bottom elevation view of the connector assembly of FIG. 5.

Referring to FIG. 2-4, the spoiler 26 is made as a single, monolithic piece of material. The spoiler 26 has a raised upper wall 30 and pair of arms 32 that are recessed below and located on opposite lateral sides of the upper wall 30. The arms 32 are generally c-shaped or v-shaped to wrap around opposite lateral edges 33 of the wiper blade 22 (see FIG. 11) to retain the connection of the spoiler 26 with the wiper blade 22 and the carrier element 21. The spoiler 26 is preferably made of a flexible plastic material so that it can flex with the wiper blade 22 and the carrier element 21 as the windscreen wiper device 20 oscillates back and forth on the curved windshield. The spoiler 26 is preferably shaped through an injection molding operation.

As shown in FIGS. 3 and 4, the upper wall 30 is provided with a pair of through holes 34 which are located in a generally central location of the spoiler 26. Specifically, the through holes 34 are disposed adjacent, but on opposite sides of, a mid-plane 35 of the spoiler 26. In the exemplary embodiment, each of the through holes 34 is generally circular in shape.

Referring now to FIGS. 5-8, in the exemplary embodiment, the connector assembly 28 includes a base 36 and a joint part 38 (also known as a spacer). The joint part 38 is shaped to directly engage an end portion of an oscillating wiper arm (not shown), and the base 36 is configured to operably connect the joint part 38 with the remainder of the windscreen wiper device 20 (see FIG. 1). The base 36 has a pair of side walls 37 which are spaced in the lateral direction from and parallel to one another. Extending from the side walls 37 of the base 36 are a pair of arms 40. The arms 40 of the base 36 wrap around the arms 32 of the spoiler 26 to retain the base 36 on the spoiler 26. Located on the sidewalls 37 of the base 36 are a pair projections 42 which are circular in shape and which extend in opposite lateral directions.

The joint part 38 has a pair of side walls 39 which are spaced in the lateral direction from and parallel to one another and which have openings 43 that are shaped to receive the projections 42 on the sidewalls 37 of the base 36 to allow the joint part 38 to pivot on the base 36 about a pivot axis A. The base 36 and joint part 38 are each preferably made as respective monolithic piece of plastic and are each shaped through an injection molding operation.

The base 36 further has a floor 44 which extends laterally between the sidewalls 37 and which, when attached with the spoiler 26, overlies the upper wall 30 of the spoiler 26. The floor 44 has a rectangularly shaped primary window 46 formed therein and which aligned with the projections 42 in the longitudinal direction. At the primary window 46, the base 36 has a pair of protrusions 48 which extend downwardly from the floor 44 and which are disposed on opposite longitudinal sides of the primary window 46. The protrusions 48 are spaced from one another by the same distance as the through holes 34 in the spoiler 26.

Figure 9:
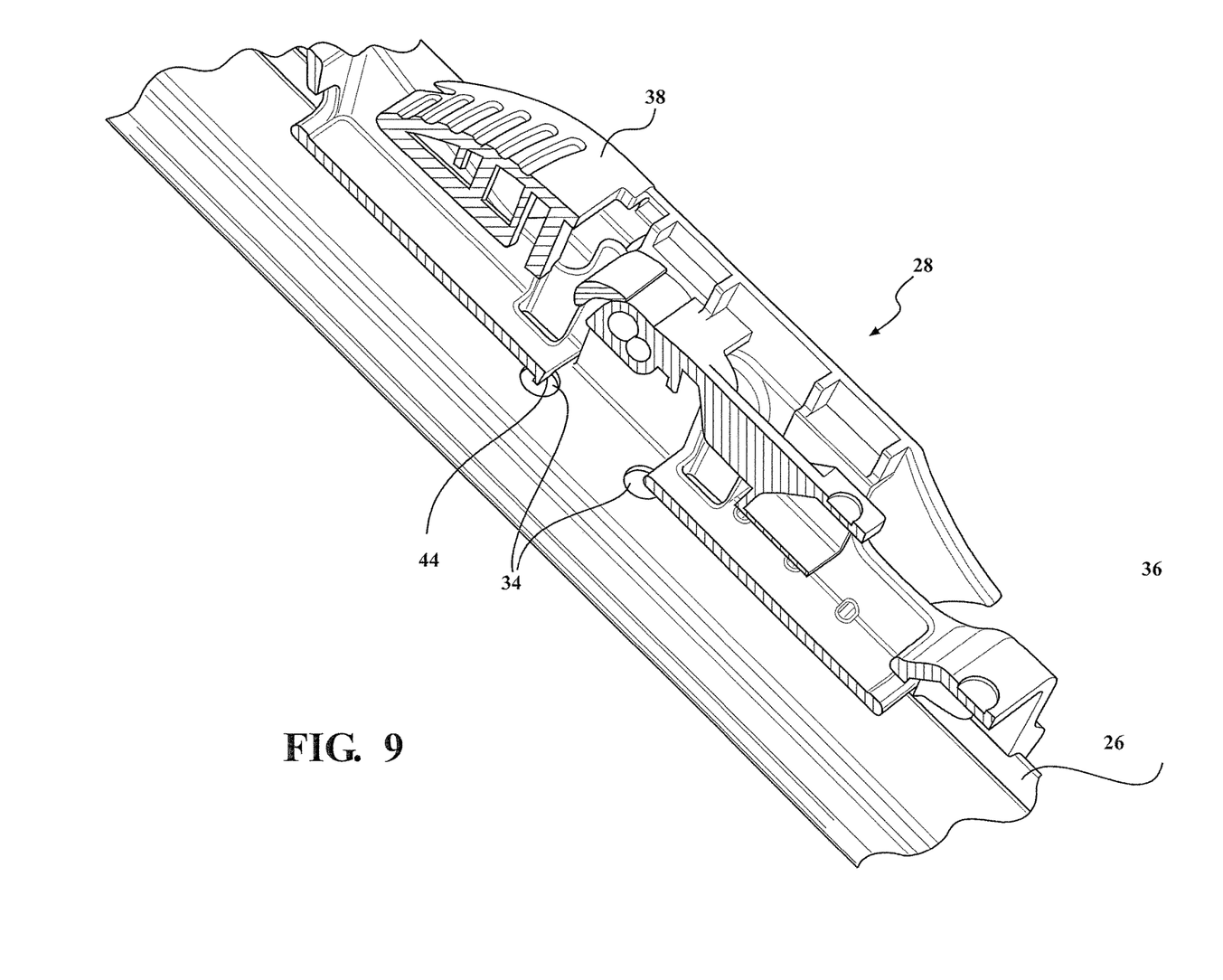
FIG. 9 is a perspective and sectional view of the windscreen wiper device of FIG. 1.
Figure 10:
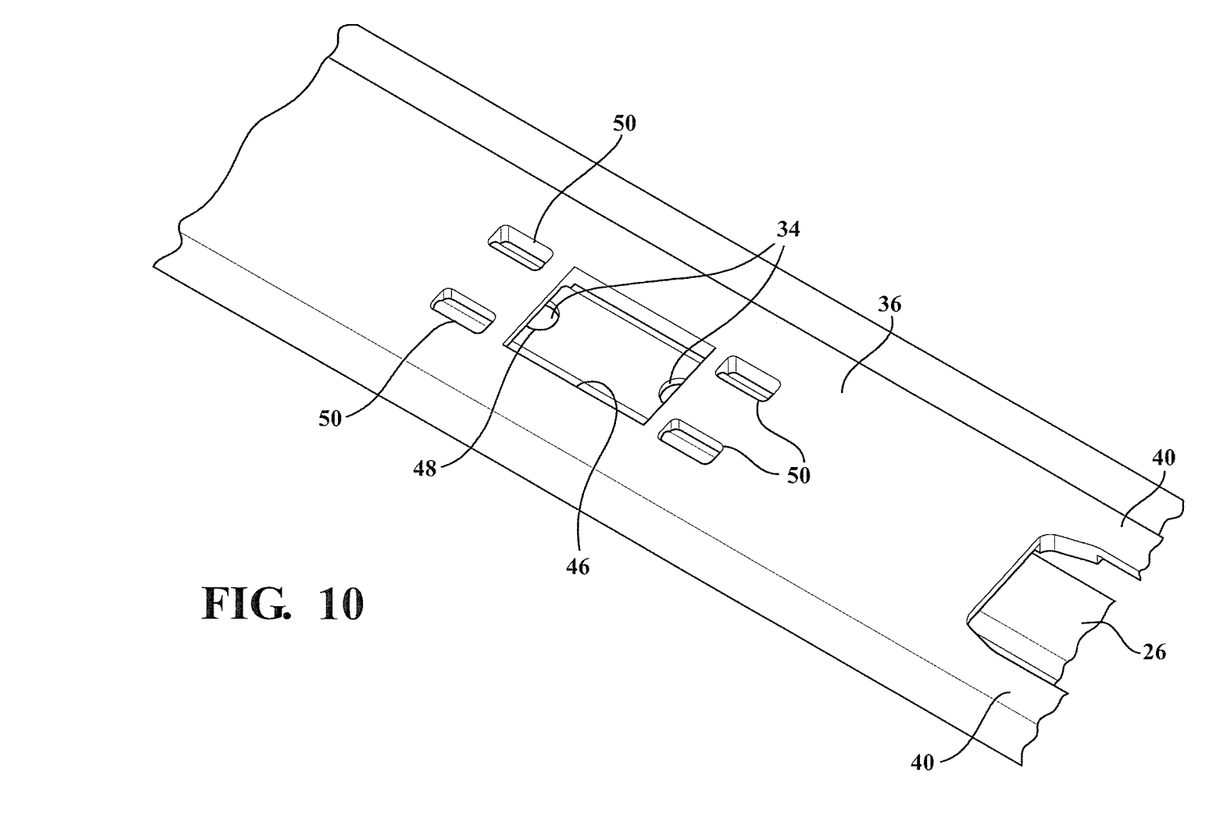
FIG. 10 is another perspective and sectional view of the windscreen wiper device of FIG. 1 taken through a different plane than FIG. 9.

Referring to FIGS. 9 and 10, when the base 36 is fixedly attached with the spoiler 26, the protrusions 48 are received in the through holes 34 to prevent longitudinal movement of the base 36 relative to the spoiler 26. Together, the arms 40 of the base 36 and the protrusions 48 establish a strong and irreversible connection between the base 36 and the spoiler 26 to prevent removal of the base 36 from the spoiler 26.

Each of the protrusions 48 is semi-circular in shape with a curved portion 49 and a linear portion 51, and the curved portion 49 has a similar diameter as the through holes 34. The linear portions 51 face longitudinally towards one another, and the curved portions 49 face longitudinally away from one another. The linear portions 51 of the protrusions 48 are generally flush with an inner edge of the floor 44 which surrounds the primary window 46 such that the protrusions 48 can be viewed from above the base 36 through the primary window 46 and through the portions of the circular through holes 34 that are not occupied by the protrusions 48. This allows an installer to visually confirm that the protrusions 48 are properly received in the through holes 34 of the spoiler 26 to fixedly attach the base 36 with the spoiler 26.

On each longitudinal side of the primary window 46, the floor 44 of the base 36 has a pair of secondary windows 50 that are on opposite lateral sides of the respective protrusion 48. The secondary windows 50 are also rectangular in shape and are smaller in area than the primary window 46.

Figure 11:
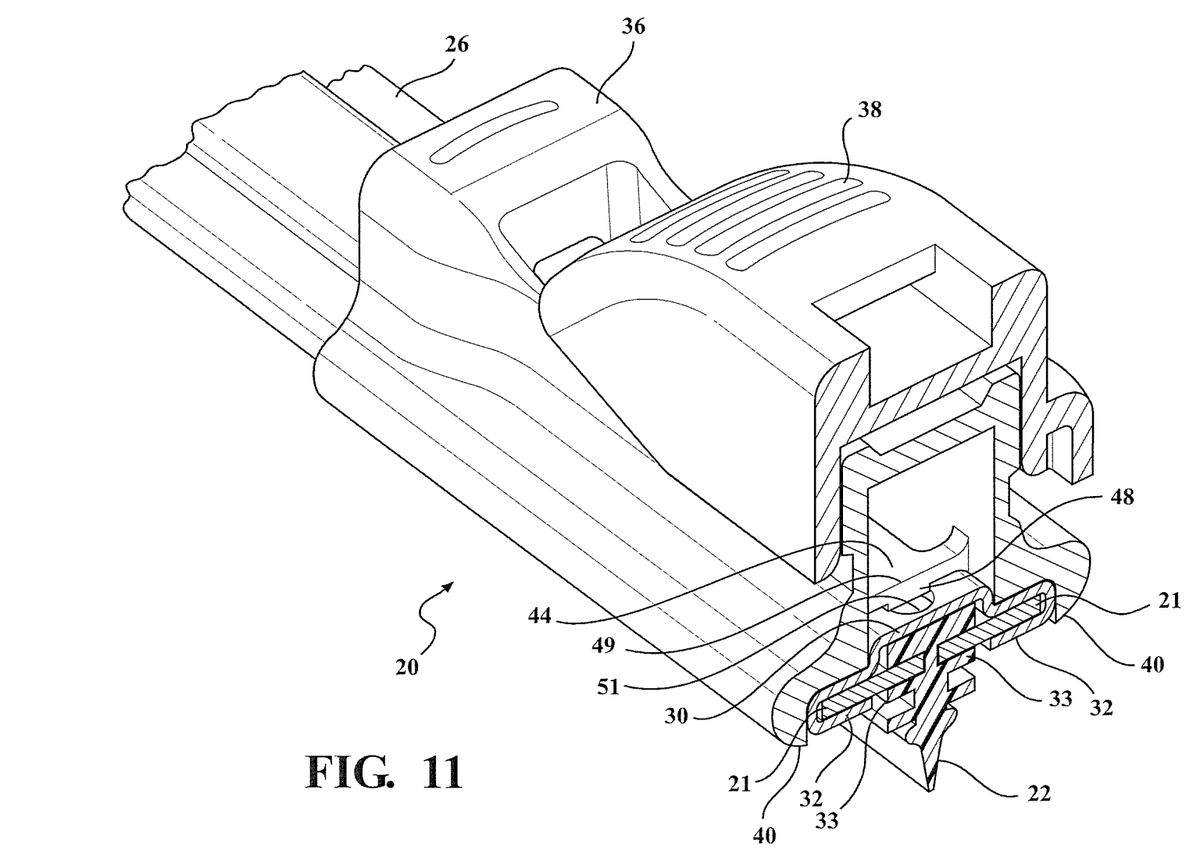
FIG. 11 is yet another perspective and sectional view of the windscreen wiper device of FIG. 1 and taken through a different plane than FIGS. 9 and 10.

Referring to FIG. 11, a sectional view of the fully assembled windscreen wiper device 20 is shown. The connection between the base 36 of the connector assembly 28, the spoiler 26, and the wiper blade 22 has been established. The floor 44 of the base 36 is overlying the upper wall 30 of the spoiler 26. The arms 40 of the base 36 are wrapped around the arms 32 of the spoiler 26 and the arms 32 of the spoiler 26 are wrapped around the opposite lateral edges 33 of the wiper blade 22. The protrusions 48 of the base 36 are shown received within the through holes 34 in the spoiler 26. The arms 40 and the protrusions 48 of the base 36 along with the arms 32 of the spoiler 26 and the lateral edges 33 of the wiper blade 22 are all in contact and fully engaged when the windscreen wiper device is fully assembled preventing the removal of the base 36 from the spoiler 26 and preventing slippage between the wiper blade 22 and spoiler 26.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A windscreen wiper device including;
an elongated wiper blade,
a spoiler coupled to and extending between opposite ends along the longitudinal length of the wiper blade, wherein the spoiler includes a raised upper wall and a pair of arms that are recessed below and located on opposite lateral sides of the upper wall, wherein the arms of the spoiler are shaped to wrap around a pair of opposite lateral edges of the wiper blade, the lateral edges being parallel in relation to one another, and wherein the upper wall of the spoiler has a pair of through holes, the through holes being located in a central location of the spoiler, and
a connector assembly being operably attached to the spoiler approximately at a longitudinal midpoint of the windscreen wiper device and detachably connecting the windscreen wiper device to an oscillating wiper arm adapted to oscillate the wiper blade along the surface of a curved windshield of a vehicle.

2. The windscreen wiper device of claim 1, wherein the spoiler is retained on a carrier element, the carrier element extending across and operably supporting the wiper blade, the carrier element biasing the wiper blade into a curved configuration to seal its full length against the curved windshield of the vehicle.

3. The windscreen wiper device of claim 2, wherein the spoiler is made of a single piece of flexible plastic material allowing it to flex with the wiper blade on the curved windshield.

4. The windscreen wiper device of claim 3, wherein a pair of endcaps is included, the endcaps being fixedly attached on the opposite ends of the spoiler connecting the wiper blade to the spoiler.

5. The windscreen wiper device of claim 1, wherein the through holes are disposed adjacent to one another on opposite sides of a mid-plane of the spoiler, and are circular in shape.

6. The windscreen wiper device of claim 5, wherein the connector assembly includes a base portion and a joint portion.

7. The windscreen wiper device of claim 6, wherein the joint portion is shaped to directly engage with the oscillating wiper arm.

8. The windscreen wiper device of claim 7, wherein the base portion is configured to operably connect the joint portion with the remainder of the windscreen wiper device.

9. The windscreen wiper device of claim 8, wherein the base portion includes a pair of arms extending from a pair of side walls, the side walls being spaced apart from one another in the lateral direction, the arms wrapping around the spoiler to retain a connection between the base portion and the spoiler.

10. The windscreen wiper device of claim 9, wherein the base includes a pair of projections, the projections being circular in shape and extending in opposite lateral direction.

11. The windscreen wiper device of claim 10, wherein the joint portion includes a pair of side walls which are spaced apart from one another in the lateral direction, the side walls further including a pair of openings that are shaped to receive the projections of the base to allow the joint portion to pivot in relation to the base portion about a pivot axis.

12. The windscreen wiper device of claim 11, wherein the base portion includes a floor which extends laterally between the arms, the floor portion overlying the upper wall of the spoiler when the windscreen wiper device is fully assembled.

13. The windscreen wiper device of claim 12, wherein the floor of the base portion includes a rectangularly shaped primary window, the primary window allowing an installer to view the base portion for proper alignment during installation.

14. The windscreen wiper device of claim 13, wherein the base portion includes a pair of protrusions, the protrusions extending downwardly from the floor and are disposed on opposite longitudinal sides of the primary window, the protrusions being spaced apart from one another by the same distance as the through holes of the spoiler so as to be received within the through holes when the windscreen wiper device is fully assembled.

15. The windscreen wiper device of claim 14, wherein the protrusions of the base portion include a curved portion and a linear portion, the curved portion being a similar diameter to the through holes of the spoiler and facing longitudinally away from one another, the linear portions being generally flush with an inner edge of the floor of the base portion and facing longitudinally towards one another.

16. The windscreen wiper device of claim 15, wherein a pair of secondary windows is included, the secondary windows being rectangular in shape and smaller in area than the primary window, the secondary windows being on opposite lateral sides of the respective protrusion.

* * * * *